US010110962B2

(12) United States Patent
Patel

(10) Patent No.: US 10,110,962 B2
(45) Date of Patent: *Oct. 23, 2018

(54) PROVIDING INTERACTIVE MULTIMEDIA SERVICES

(71) Applicant: International Business Machines Corporation, Armonk, NY (US)

(72) Inventor: Paritosh Dinubhai Patel, Parkland, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/696,169

(22) Filed: Sep. 5, 2017

(65) Prior Publication Data
US 2017/0366853 A1 Dec. 21, 2017

Related U.S. Application Data

(63) Continuation of application No. 15/090,621, filed on Apr. 5, 2016, now Pat. No. 9,924,230, which is a (Continued)

(51) Int. Cl.
*G06F 7/00* (2006.01)
*G06F 17/30* (2006.01)
(Continued)

(52) U.S. Cl.
CPC ......... *H04N 21/4722* (2013.01); *G06F 3/167* (2013.01); *G06F 17/30026* (2013.01);
(Continued)

(58) Field of Classification Search
CPC ......... G06F 17/30058; G06F 17/30026; G06F 17/30056; G06F 17/30755; H04L 67/306; H04N 21/4722
(Continued)

(56) References Cited

U.S. PATENT DOCUMENTS

| 5,541,662 A | 7/1996 | Adams et al. |
| 6,184,877 B1 | 2/2001 | Dodson et al. |

(Continued)

FOREIGN PATENT DOCUMENTS

CN   101035221   9/2007

OTHER PUBLICATIONS

Ozawa, Toshiro. TV Recording Device with a Search Engine. IPCOM000127571D, Sep. 1, 2005. The IP.com Prior Art Database. <https://priorart.ip.com/IPCOM/000127571>.

*Primary Examiner* — Md I Uddin
(74) *Attorney, Agent, or Firm* — The Steadman Law Firm PLLC

(57) ABSTRACT

A method for presenting interactive multimedia programs includes selecting a multimedia program having a plurality of segments, classifying the multimedia program and the plurality of segments according to content, and generating a plurality of additional content items based on the classification, each of which being associated with at least one of the plurality of segments. The method further includes generating a plurality of pre-defined queries for each of the plurality of segments based on a content of the segment and at least one speech recognition grammar based on the plurality of pre-defined queries. The plurality of additional content items are retrievable responsive to the plurality of pre-defined queries. The method further includes generating a data stream including the at least one speech recognition grammar and all of the plurality of additional content items and the plurality of pre-defined queries arranged according to an order of the plurality of segments.

18 Claims, 3 Drawing Sheets

Related U.S. Application Data continuation of application No. 11/949,623, filed on Dec. 3, 2007, now Pat. No. 9,344,666.

(51) Int. Cl.

| | |
|---|---|
| *H04N 21/4722* | (2011.01) |
| *G10L 15/18* | (2013.01) |
| *G10L 15/22* | (2006.01) |
| *G06F 3/16* | (2006.01) |
| *H04N 21/845* | (2011.01) |
| *H04N 21/84* | (2011.01) |
| *H04N 21/81* | (2011.01) |
| *H04N 21/462* | (2011.01) |
| *H04N 21/4402* | (2011.01) |
| *H04N 21/439* | (2011.01) |
| *H04N 21/433* | (2011.01) |
| *H04N 21/422* | (2011.01) |
| *H04N 5/445* | (2011.01) |
| *G10L 15/08* | (2006.01) |
| *H04N 21/44* | (2011.01) |

(52) U.S. Cl.
CPC .. *G06F 17/30056* (2013.01); *G06F 17/30755* (2013.01); *G10L 15/1815* (2013.01); *G10L 15/22* (2013.01); *H04N 5/44508* (2013.01); *H04N 21/42203* (2013.01); *H04N 21/4332* (2013.01); *H04N 21/4394* (2013.01); *H04N 21/440236* (2013.01); *H04N 21/4622* (2013.01); *H04N 21/8133* (2013.01); *H04N 21/84* (2013.01); *H04N 21/8456* (2013.01); *G10L 2015/088* (2013.01); *G10L 2015/223* (2013.01); *H04N 21/44008* (2013.01)

(58) Field of Classification Search
USPC .................................. 707/706, 736, 740, 737
See application file for complete search history.

(56) References Cited

U.S. PATENT DOCUMENTS

| | | |
|---|---|---|
| 6,240,555 B1 | 5/2001 | Shoff et al. |
| 6,314,569 B1 | 11/2001 | Chernock et al. |
| 6,408,128 B1 | 6/2002 | Abecassis |
| 6,424,946 B1 | 7/2002 | Tritschler et al. |
| 6,630,963 B1 | 10/2003 | Billmaier |
| 6,750,919 B1 | 6/2004 | Rosser |
| 6,970,189 B1 | 11/2005 | Bernstein et al. |
| 6,980,113 B1 | 12/2005 | Uehran |
| 7,356,250 B2 | 4/2008 | Betz et al. |
| 7,480,442 B2 | 1/2009 | Girgensohn et al. |
| 7,742,106 B2 | 6/2010 | Ko et al. |
| 8,503,796 B2 * | 8/2013 | He .................. G06K 9/6267 382/224 |
| 2005/0187644 A1 | 8/2005 | Neale et al. |
| 2005/0278773 A1 | 12/2005 | DeCinque et al. |
| 2006/0090186 A1 | 4/2006 | Santangelo et al. |
| 2007/0016401 A1 | 1/2007 | Ehsani et al. |
| 2007/0081678 A1 | 4/2007 | Minnich |
| 2008/0089666 A1 | 4/2008 | Aman |
| 2008/0162713 A1 | 7/2008 | Bowra et al. |
| 2008/0172376 A1 | 7/2008 | Yu et al. |
| 2008/0209482 A1 | 8/2008 | Meek et al. |
| 2008/0271072 A1 | 10/2008 | Rothschild et al. |
| 2008/0281806 A1 | 11/2008 | Wang et al. |
| 2008/0288259 A1 | 11/2008 | Chambers et al. |
| 2009/0019027 A1 | 1/2009 | Ju et al. |
| 2009/0189982 A1 | 7/2009 | Tawiah |
| 2009/0245046 A1 | 10/2009 | Utsumi et al. |
| 2010/0269138 A1 | 10/2010 | Krikorian et al. |

* cited by examiner

PROVIDING INTERACTIVE MULTIMEDIA SERVICES

FIELD OF THE INVENTION

This invention is related to the field of interactive multimedia services and is related more particularly to provision of interactive multimedia programs.

BACKGROUND OF THE INVENTION

In general, presentation of multimedia programs is a passive activity from the viewpoint of the user. That is, not only is the content of a multimedia program typically static, but the order in which the content is presented is also static. However, most users are typically interested in obtaining additional content associated with a multimedia presentation. Unfortunately, such additional content is generally not available from the multimedia program itself, and users typically must engage in independent research to uncover such content. Some multimedia programs do provide a user with a prompt during presentation of a multimedia program. Such a prompt can lead a user to a location of additional content, but in doing so, the prompt generally guides the user away from the multimedia program. Furthermore, the content provided by such prompts typically pertains only to specific, limited content at specific points in the multimedia program.

SUMMARY

The present invention is directed to a system, computer product, and related methods for providing interactive multimedia programs with enhanced capabilities. In one aspect, the invention provides an interactive multimedia program with the capability to provide various amounts of diverse information at different points during an interactive multimedia presentation.

In a first embodiment of the invention, a method for presenting interactive multimedia programs is provided. The method can include the steps of selecting a multimedia program for presentation. The program can have one or more segments and a plurality of additional content items. Each of the items can be associated with at least one of the segments and be responsive to at least one of a plurality of pre-defined queries for the program. The method further can include receiving at least one user query during presentation of the program, identifying one of the pre-defined queries corresponding to the user query, and retrieving one of the items associated with a current segment of the program and responsive to the identified one of the pre-defined queries.

In another embodiment of the invention, an interactive multimedia system is provided. The system can include a multimedia processing element for presenting a multimedia program, the program having one or more segments and a plurality of associated content items. Each of the items can be associated with at least one of the segments and be responsive to at least one of a plurality of pre-defined queries for the program. The processing element can provide at least one user interface element for receiving at least one user query during presentation of the program. Additionally, the system can include a query processing element for identifying one of the pre-defined queries corresponding to the user query and for retrieving one of the items associated with a current segment of the program in response to the identified one of the pre-defined queries.

In yet another embodiment of the invention, a computer-readable storage medium is provided. The computer-readable storage medium can have stored therein a plurality of instructions executable by a computer. The plurality of instructions can include code sections for performing the steps of selecting a multimedia program for presentation, the program having one or more segments and a plurality of associated content items, where each of the items is associated with at least one of the segments and is responsive to at least one of a plurality of pre-defined queries for the program. The plurality of instructions also can include code sections for causing at least one user query to be received during presentation of the program, for identifying one of the pre-defined queries corresponding to the user query, and for retrieving one of the items associated with a current segment of the program in response to the identified one of the pre-defined queries.

DETAILED DESCRIPTION

Figure 1:
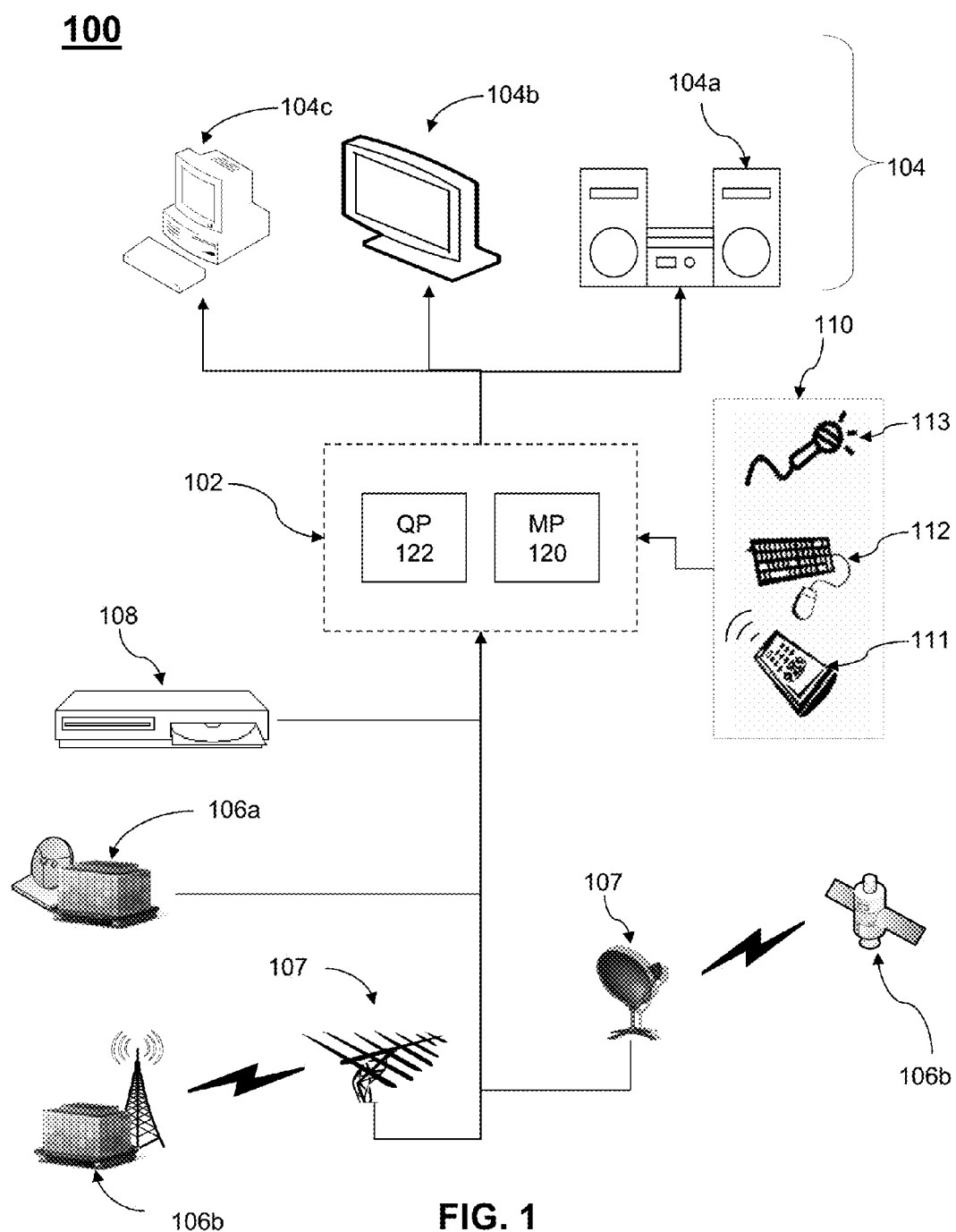
FIG. 1 is a schematic view of an exemplary communications system supporting presentation of interactive multimedia programs according to an embodiment of the present invention.

Typically, when presenting a multimedia program, once the user has selected a program for presentation, the interaction between the user and multimedia program is ended. That is, the user usually cannot obtain additional information regarding the content of the program from the program itself. In some cases, such as when viewing programs using interactive program guide services, the user can obtain title, date, and participant information. Sometimes the user can also obtain a synopsis. However, the user is generally precluded from obtaining any additional content. For example, a user viewing a nature documentary cannot obtain precise location information about the images being displayed, other than that provided by the narrative.

According to another example, a user listening to a radio broadcast of an opera may be able to obtain basic title, singer, venue, arranger information, but cannot retrieve any type of biographical information. These types of limitations on the presentation of multimedia content are generally due to the fact that multimedia programs are not only typically presented in a linear fashion, but are time-limited as well. As a result of these limitations, producers of such programs typically have to cut or exclude content and information, including content or information which may be of interest to at least some users.

Many users may be dissatisfied with the limited amount of content provided during presentation of a multimedia program. For example, referring back to the nature documentary example, a user who is planning a trip to the locations shown in the documentary may wish to obtain precise geographic coordinates of a location or contact information for persons interviewed. Although users can obtain the same content or information via alternate channels, such as the Internet, doing so typically requires additional research, which can be time consuming for the user. Sometimes, some of the content may not be easily accessible. Indeed, the content may not be accessible at all. As a result, the user may be distracted throughout the rest of the multimedia program, causing the user to ignore portions that the producer believed were important or critical to the user's experience with the program. Moreover, a user may get distracted and lose interest in the multimedia program, costing broadcasters and advertisers revenue dollars.

Embodiments of the present invention provide a system and method for presenting interactive multimedia programs, where the user can interact with the multimedia program to retrieve additional content associated with the multimedia program without interfering with presentation or enjoyment of the program. One aspect of the present invention provides for presenting a multimedia program using a multi-channel transmission, where at least one channel is used for transmitting the multimedia program content and at least one other channel is used for transmitting the additional content. Another aspect of the present invention provides for providing the additional content to users on the basis of one or more user queries, rather than prompting or otherwise forcing the user to view content he is not interested in.

FIG. 1 depicts an exemplary embodiment of a communications system 100 supporting presentation of interactive multimedia programs according to embodiments of the present invention. As shown in FIG. 1, the system 100 can comprise an interactive multimedia system (IMS) 102 for presenting interactive multimedia programs. According to embodiments of the present invention, interactive multimedia programs can include any presentation of sounds, information, still images, moving images, or any combination thereof. The IMS 102 can include a multimedia processing element (MP) 120 for presenting these multimedia programs. Multimedia programs can be provided to the IMS 102 using digital technologies, analog technologies, or any combination thereof. Furthermore, the multimedia programs can include, as previously noted, one or more channels of information. For example, a multi-channel digital television program can include a video channel, an audio channel, a closed captioning channel, and one or more data channels. In the embodiments of the present invention, an IMS 102 can present the multimedia programs using media devices 104 such as audio devices 104a, video devices 104b, computer units 104c, or any combination thereof. In some embodiments, the multimedia program can be presented using multiple media devices 104.

The IMS 102 can receive interactive multimedia programs from a variety of remote sources 106a, 106b, and/or local sources 108. Local sources 108 can include devices such as audio/video consumer electronic devices (e.g., audio and video disc-based players, analog and digital video tape players, phonographs, analog and digital audio tape players, MP3 players, digital still and video cameras, and computing devices). Remote sources can include both wireline sources 106a and wireless 106b sources. For example, wireline 106a sources can include Internet protocol television (IPTV) subsystems, cable television (CATV) subsystems, wireline telephony networks, and wireline data networks. Wireless sources 106b, for example, can include satellite television and radio subsystems, terrestrial television and radio broadcasts, wireless telephony networks, and wireless data networks. In the case of a wireless source 106b, an antenna element 107, such as an aerial antenna, satellite dish, or other reception hardware, can be used to receive the multimedia program. One of ordinary skill in the art should appreciate that the invention is not limited to the aforementioned examples and that local sources 108 and remote sources 106a, 106b can encompass any potential source of multi-channel multimedia programs.

As shown in FIG. 1, the IMS 102 can also include a command or query processing element (QP) 122 for processing user commands and queries for managing the IMS 102. One or more input devices can be provided for users to input commands for managing the IMS 102. These input devices 110 can be configured to communicate with the IMS 102 using wireline or wireless technologies. For example, input devices 110 can include a wireless controller 111 using infrared or radio frequency (RF) signals to wirelessly communicate with the IMS 102. The input devices 110 can include a wireline or wireless keyboard and/or pointing devices 112. Alternatively, the input device 110 can also include an audio input 113 for accepting speech-based commands. In the various embodiments of the present invention, the type, configuration, and number of input devices provided for the IMS 102 can vary based on the types of users. Although a single input device 110 can be used to manage the IMS 102, it is also within the scope of the present invention to use a combination of input devices 110 to enter commands for managing the IMS 102. These exemplary embodiments of input devices 110 are presented by way of example and not by way of limitation. Accordingly, it should be apparent to one of ordinary skill in the art that any type of input device can be used to manage the IMS 102.

In the exemplary embodiment of the system 100 shown in FIG. 1, the IMS 102, media devices 104, local sources 108, and antenna elements 107 are shown as distinct and separate elements. However, it is also within the scope of the present invention to incorporate the IMS 102 into another device. For example, the IMS 102 can be incorporated in a television set. In another example, the IMS 102 can be incorporated in a set-top box (STB) for digital video recording or channel tuning. In yet another example, the IMS 102 can be incorporated in an audio system. Accordingly, the IMS 102 can be incorporated in any device capable of receiving or presenting at least a portion of the multi-channel multimedia program. For example, a typical home theatre system can include a television cooperatively coupled with a surround sound system to present multimedia programs from a STB or a DVD player. In such an arrangement, the IMS 102 could be incorporated into the television, the sound system, or both.

Figure 2:
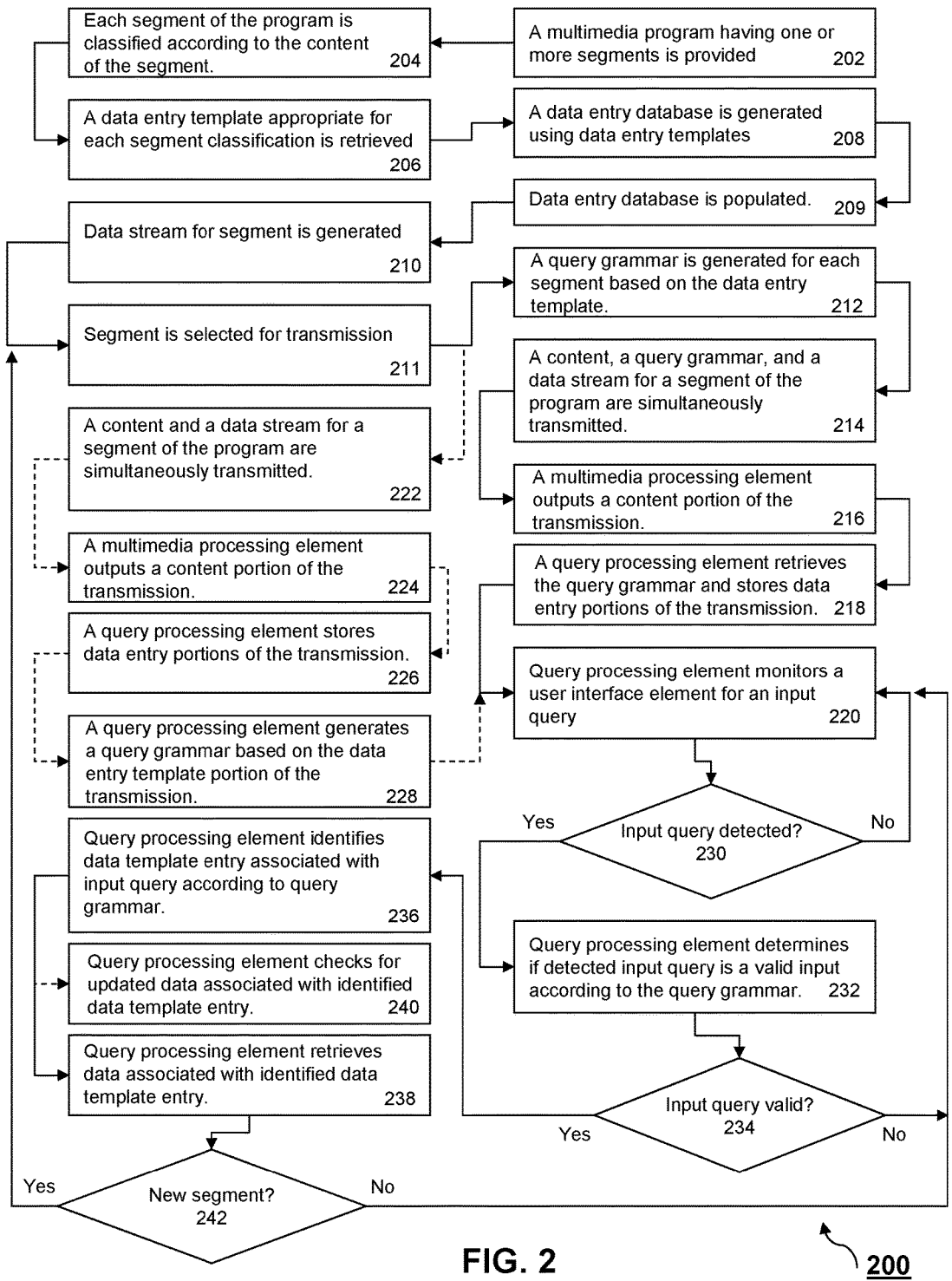
FIG. 2 is a flowchart of exemplary steps of a method for presenting interactive multimedia programs according to an embodiment of the present invention.

FIG. 2 shows an exemplary method 200 operating in parts of system 100 according to an embodiment of the present invention. In step 202 of the exemplary method 200, a multimedia program having one or more segments can be selected for transmission or presentation. The segments can be defined by any type of division in the multimedia program. For example, a multimedia presentation may be divided into segments by time, topic(s), participant(s), location(s), or any combination thereof—to name a few. For example, a multimedia program regarding a number of locations may be divided by location, but can also be further divided by topics discussed at each location.

Once the segments for the multimedia program are identified in step 202, the multimedia programs or their segments can be classified according to their content in step 204. Classification of the multimedia programs can be necessary because different types of multimedia programs can include different types of content that can affect the types of data that are likely available for the program. For example, the type of content associated with sporting event can be different than that associated with a nature documentary or a news show. In the sporting event, content can include player, team, venue, and other sporting event information and statistics. In contrast, the nature documentary content can include location, wildlife, plant life, and weather information. The present invention can also classify the various segments of the multimedia program. Such classifications can be necessary because even within a single multimedia program, different portions can be presented in different formats. In some embodiments, the multimedia program segments can have separate classifications. In other embodiments, the classifications for the various segments can be sub-classifications of the classification of the entire program. For example, the nature documentary can include, as previously discussed, narrative portions and interview portions. Therefore, although each segment can be generically classified as narrative and interview segments, alternatively the segments can be classified into the sub-classifications of a nature documentary narrative segment and nature documentary interview segment.

Once the multimedia program or the segments therein have been classified in step 204, a data entry template for each classified segment can be retrieved in step 206 and a database for the multimedia program can be generated in step 208. The data entry template can be used to generate a database of content likely to be associated with a segment of a particular classification. Although the data entry templates can be static for each type of classification, in some embodiments, the data entry templates, upon retrieval, can be further customized for a particular media program or segment that includes other types of content. A data entry template can be as simple as a listing of the types of content typically associated with a classification of segment. The listing can then be used to generate a database of content using a database application. In other embodiments, the data entry template can instead be an empty database, ready to be populated with content. However, the data entry templates need not be provided separately and can be included in a single database, where database includes the template information sorted by segment.

Regardless of how the database is generated in step 208, the database can be populated in step 209. Entries for the database are not limited to pieces of textual information, but can also include audio, video and/or graphical information. For example, referring back to the nature documentary example, additional information on wildlife can include images (still or moving) or sounds of specific animals. However, the types of entries can also be limited by the type of multimedia program. For example, for an audio/video presentation, text, sounds, and images can be included. In contrast, entries for an audio program may be limited to only text and/or sounds, as a display device may not be available during playback of an audio program.

Using the database populated in step 209, a data stream for the multimedia program can then be generated in step 210. The stream can include all the content and identifying information for the content, based on the template, arranged according to the order of the segments in the program. The timing of the data stream can be configured to coincide with the timing of the segments of the multimedia presentation as they are presented to the user. That is, as the multimedia program moves from segment to segment, the content of the data stream can also vary. For example, the data stream can be configured to provide a cumulative source of content so that at any point in the multimedia program, the user will have access to any content previously available. However, the data stream can also be configured to include only content relevant to the current content of the multimedia presentation. Therefore, content not considered relevant to the content in current segment of the multimedia presentation is not included in the current portion of the data stream.

Once the data stream is generated in step 210, a query grammar for interpreting commands to access the data in the data stream can be generated in step 212. It is to be noted that the term "grammar" is used herein in a generic sense and pertains to any technologies that return speech-interpreted outputs. In human speech, for example, a grammar specifies a relatively limited, finite number of ways to express a thought. By contrast, a grammar, such as statistical grammar is considerably more robust, albeit typically computing- and memory-intensive. Accordingly, the term grammar, as used herein, refers broadly to all of the various types of grammars that can be used for rendering speech-interpreted outputs regardless of the underlying technology utilized.

The query grammar can be used for responding to commands and queries that are input using the input devices 110. Such a configuration is advantageous because using a grammar-based recognition of commands and queries does not require the user to know a specific command or query form for retrieving content. Instead, the user can input a command or query using any type of format. The query grammar can then interpret the command and, if valid for the grammar, take the appropriate action. The query grammar can be generated based on the content and the data entry templates used to generate the data stream. Accordingly, only a limited grammar need be generated. By providing a limited grammar rather than a full grammar for recognizing any command to the IMS 102, the IMS 102 can be configured to be responsive to commands regarding only available content and prevent unnecessary searches for unavailable content during a presentation of the multimedia content.

In some embodiments, a single query grammar can be generated for the multimedia program. However, because the content of different segments and the associated content can vary, a query grammar can be generated for each segment of the multimedia program. Regardless of how the query grammar or grammars are generated, the generated grammar or grammars can be included as a first portion of the data stream, presented prior to the content that the grammar or grammars are based on.

One aspect of the present invention provides that a multimedia program is delivered in step 214 to the IMS 102, the program including a one or more program content streams in one or more content channel channels, a data stream of additional content in a data channel, and associated query grammar(s) in a same or separate data channel. The IMS 102 can then, in step 216, use the MP 120 to display the multimedia program content from content channels on a media device 104. The IMS 102 can also, in step 218, retrieve the query grammar for the QP 122 and the content in the data stream. The IMS 102 can use a storage element to store and access the query grammar and the additional content as needed. In the various embodiments, a pre-processor portion (not shown) of the IMS 102 can be used to determine what types of streams are located in the various channels being received by the IMS 102. However, in some embodiments the pre-processing portion, or at least its functionality, can also be incorporated into the QP 122 or the MP 120. In other embodiments, the channels can be standardized and the MP 120 and the QP 122 can receive all channels and selectively choose the content and data streams, respectively, according to the channel standard. Once presentation of the program begins, the QP 122 can then monitor for user commands or queries in step 220.

Another aspect of the present invention provides that the query grammar is not provided to the IMS 102. Rather, the IMS 102 can be configured to generate the query grammar as needed. Such a configuration is advantageous in that the amount of data channels or data bandwidth needed to deliver a multimedia program is reduced. In such embodiments, only the program content streams and data streams are delivered to the IMS 102 in step 222. As described before, the multimedia program content can then be presented in step 224, and the additional content in the data stream can be stored in step 226. However, the QP 122 can be configured to generate a grammar based on the received data stream in step 228. Because the data stream inherently includes both the content and the data entry template used to generate the data stream, the QP 122 can be configured to extract the template from the data stream and generate the necessary query grammar, as previously described for step 212. Furthermore, the query grammar can be generated by the QP 122 on a program basis or on a segment-by-segment basis. In a segment-by-segment method, the query grammars can be generated at the beginning of the presentation of each segment. However, it is also within the scope of the present invention to initially provide a "burst" of all information, including segment information, at the beginning of the presentation of the multimedia program to allow the QP 122 to generate all necessary query grammars. Afterwards, the QP 122 can monitor for user commands or queries in step 220.

As previously described, one or more input devices 110 can be used to provide input to the IMS 102. In some embodiments of the present invention, a speech-based input can be used. In other embodiments, commands can be provided to the IMS 102 using a wireless controller 111 or a keyboard and/or pointing device 112. If the QP 122 does not detect any type of input in step 230, then the QP can continue to monitor for an input in step 220.

If the QP 122 does detect an input in step 230, then the QP 122 can determine whether the input is associated with a valid command or query for retrieving content from the data stream. However, the manner in which commands are processed can vary depending on the way in which inputs are processed. For example, in a speech-based system, the QP 122 can be configured to convert all input speech using a speech-to-text system. Therefore, once the text of the input speech is available, the QP 122 can use the query grammar to determine whether the input corresponds to a valid command in step 232. If the command is determined to be invalid in step 234, the QP 122 can continue to monitor for inputs in step 220. Such a configuration can be advantageous because the QP 122 can be simplified by always requiring a text input. Thus the same input interface can be used to link the QP 122 to a speech-to-text processor and to a keyboard 112 or other text input interface.

However, in some embodiments the speech-to-text system can be included in the QP 122. That is, the QP 122 can be configured to both recognize text and afterwards determine if the speech defines a valid command. In at least one embodiment, the query grammar can also be used as the speech recognition grammar. Therefore, rather than recognizing all input speech, only speech that can be recognized using the query grammar is considered a valid input. Such a configuration is advantageous because the recognition and the determination of validity of the command can be accomplished in a single step, as only valid speech commands will be recognized by the query grammar.

Once the QP 122 determines in step 234 that the input detected corresponds to a valid command, the QP 122, in step 236, can access a memory location for the additional content associated with the input command recognized. Afterwards, in step 238, the QP 122 can retrieve the content and present the retrieved content to the user. That is, the retrieved content can be passed to the MP 120, which then outputs the content to a media device 104. The format and arrangement of the presented content can vary. In some embodiments, the MP 120 can be configured to present the content in one or more standard arrangements. However, the retrieved content itself can specify how the data is to be presented. For example, the retrieved content can also include instructions for the MP 120 to display the data entries in a certain arrangement.

In other embodiments, the MP 120 can also be configured to determine how to best present the content based on the available capabilities of the media devices 104. For example, if the MP 120 is presenting the retrieved content using an audio output device, the MP 120 can determine that visual content should not be shown. Furthermore, the MP 120 can determine that audio sounds will be required to present the content. In such embodiments, the MP 120 can include a text-to-speech system to output textual content in a spoken format. The spoken text can then be output as additional sounds during the playback of the audio program. Similarly, the MP 120 can determine that content that includes a high resolution image needs to be converted to a lower resolution image when a high resolution display is unavailable. In some embodiments, the retrieved data can also specify how to present the content for different types of output devices.

In yet other embodiments, the MP 120 can also be configured to determine whether not to alter presentation of the original program. For example, although additional content can be presented as a voiceover during a playback of an opera or orchestral piece, providing a voiceover during a recording of a conversation can easily confuse the listener. In such embodiments, the MP 120 can be configured to determine that if a substantial overlap exists between the voiceover and the original sounds, the volume of the original program should be reduced so that the speech can be used as a proper voiceover. In some cases, instead of reducing volume, the original program can be presented, for example, using only one of two available audio loudspeakers and the voiceover can be presented using the other loudspeakers. In another example, although visual content can be shown in a small area of a display output device, the visual content may be of a nature that cannot be adequately shown in the small area. Instead, the MP 120 can reduce the size of the original program and use a larger portion of the display output device to display the visual content. Additionally, instructions for altering the presentation of the original program can be included with the data. Such embodiments can be advantageous as the amount of processing required by the MP 120 can be reduced.

Although the exemplary embodiments described above provide examples showing the retrieval of additional content from the data stream only, the invention is not limited in this regard. In some embodiments, prior to retrieving and presenting additional content in step 238, the QP 122 can also be configured to determine whether updated content exists. For example, in a live sporting event information is constantly being updated. Scores, statistics, penalties, and other values change throughout the event. In such embodiments, the QP 122 can be configured to access one or more remote servers via a data network to retrieve updated information. In some cases, the content in the data stream can include not only the content available at the time of generating the stream, but can also include one or more locations for obtaining updated content. Therefore, the QP 122 can determine in step 240 whether any updated content exists for the data stream and retrieve and present this content in step 240.

In some embodiments, the content can be updated only once or after an interval of time has elapsed. In other embodiments, the information can be updated when uploaded to the IMS 102 or only when the content is requested by a user query. Accordingly, the IMS 102 can be configured to provide a system for updating the content that is most efficient for the type of content being updated and the network capabilities of the IMS 102. Once the content has been presented in step 238, the IMS 102 can determine if another segment has started in step 242. If not, the IMS 102 can continue monitoring for inputs and responsively outputting content as in steps 220 and 230-238. If a new segment is started, the processing for the segment starting with steps 212 or 222 can be repeated.

Figure 3:
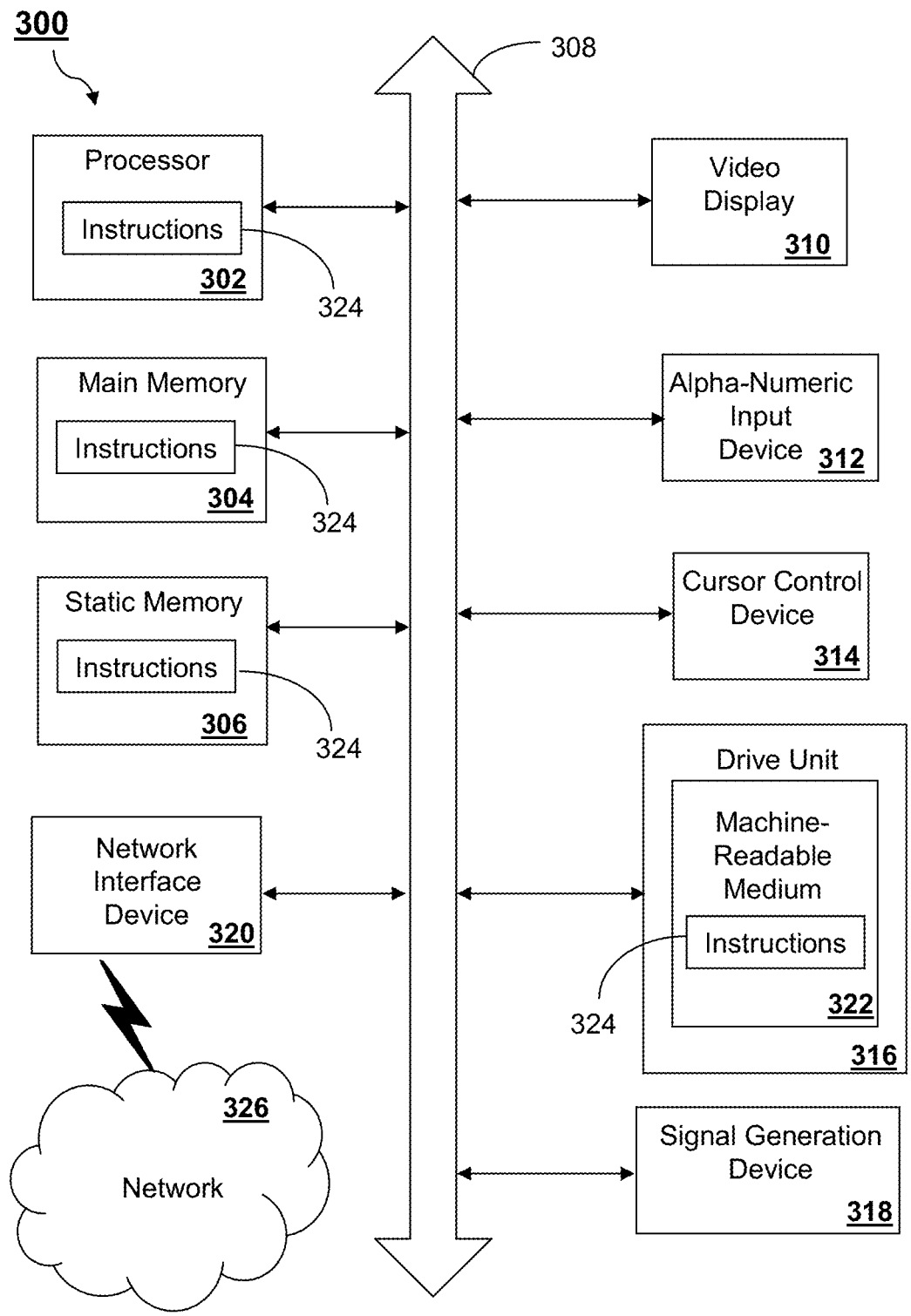
FIG. 3 is a schematic view of a computer system within which a set of instructions operate according to an embodiment of the invention.

FIG. 3 is a schematic diagram of a computer system 300 for executing a set of instructions that, when executed, can cause the computer system to perform one or more of the methodologies and procedures described above. In some embodiments, the computer system 300 operates as a standalone device. In other embodiments, the computer system 300 can be connected (e.g., using a network) to other computing devices. In a networked deployment, the computer system 300 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 300 can include a processor 302 (such as a central processing unit (CPU), a graphics processing unit (GPU, or both), a main memory 304 and a static memory 306, which communicate with each other via a bus 308. The computer system 300 can further include a display unit 310 such as a video display (e.g., a liquid crystal display or LCD), a flat panel, a solid state display, or a cathode ray tube (CRT)). The computer system 300 can include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 can include a computer-readable storage medium 322 on which is stored one or more sets of instructions 324 (e.g., software code) configured to implement one or more of the methodologies, procedures, or functions described herein, including those methods illustrated above. The instructions 324 can also reside, completely or at least partially, within the main memory 304, the static memory 306, and/or within the processor 302 during execution thereof by the computer system 300. The main memory 304 and the processor 302 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 324 or that receives and executes instructions 324 from a propagated signal so that a device connected to a network environment 326 can send or receive voice and/or video data, and that can communicate over the network 326 using the instructions 324. The instructions 324 can further be transmitted or received over a network 326 via the network interface device 320.

While the computer-readable storage medium 322 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    configuring a computer system including at least one memory and at least one processor to perform steps of:
        selecting a multimedia program for presentation, the multimedia program having a plurality of segments;
        classifying each segment of the plurality of segments according to associated content;
        for each given segment of the plurality of segments, retrieving a data entry template based, at least in part, upon the classification of the given segment;
        for each given segment of the plurality of segments, populating a data entry database via the data entry template corresponding to the given segment;
        generating a data stream via the data entry database, wherein a timing of the data stream is configured to coincide with a timing of the plurality of segments upon presentation by a multimedia system;
        generating at least one query grammar, wherein the at least one query grammar is programmed to interpret commands to access content in the data stream;
        simultaneously transmitting, to the multimedia system, the content associated with at least one of the plurality of segments, one or more of the at least one query grammar, and the data stream;
        monitoring a user interface element to detect an input query;
        determining whether the input query is valid according to the at least one query grammar; and
        responsive to the determination that the input query is valid, retrieving content associated with the input query, including any updated information for the data stream.

2. The method of claim 1, wherein the at least one query grammar comprises a plurality of respective query grammars associated with each of the plurality of segments.

3. The method of claim 1, wherein the content in the data stream is arranged according to an order of the plurality of segments.

4. The method of claim 1, wherein at least one data entry template among the respective data entry templates includes a listing of content types associated with a segment classification.

5. The method of claim 1, wherein the data stream is configured to provide a cumulative source of content.

6. The method of claim 1, wherein the content in the data stream is updated based upon retrieval of updated information.

7. A system comprising:
    at least one memory; and
    at least one processor including:
        a multimedia processing element for selecting a multimedia program having a plurality of segments for presentation; classifying each segment of the plurality of segments according to associated content; for each given segment of the plurality of segments, retrieving a data entry template based, at least in part, upon the classification of the given segment; for each given segment of the plurality of segments, populating a data entry database via the data entry template corresponding to the given segment; generating a data stream via the data entry database, wherein a timing of the data stream is configured to coincide with a timing of the plurality of segments upon presentation by a multimedia system; generating at least one query grammar, wherein the at least one query grammar is programmed to interpret commands to access content in the data stream; simultaneously transmitting, to the multimedia system, the content associated with at least one of the plurality of segments, one or more of the at least one query grammar, and the data stream; monitoring a user interface element to detect an input query; determining whether the input query is valid according to the at least one query grammar; and responsive to the determination that the input query is valid, retrieving content associated with the input query, including any updated information for the data stream.

8. The system of claim 7, wherein the at least one query grammar comprises a plurality of respective query grammars associated with each of the plurality of segments.

9. The system of claim 7, wherein the content in the data stream is arranged according to an order of the plurality of segments.

10. The system of claim 7, wherein at least one data entry template among the respective data entry templates includes a listing of content types associated with a segment classification.

11. The system of claim 7, wherein the data stream is configured to provide a cumulative source of content.

12. The system of claim 7, wherein the content in the data stream is updated based upon retrieval of updated information.

13. A non-transitory computer-readable storage medium having stored therein a plurality of instructions executable by a computer, the plurality of instructions comprising code sections for performing steps of:
    selecting a multimedia program for presentation, the multimedia program having a plurality of segments;

classifying each segment of the plurality of segments according to associated content;
for each given segment of the plurality of segments, retrieving a data entry template based, at least in part, upon the classification of the given segment;
for each given segment of the plurality of segments, populating a data entry database via the data entry template corresponding to the given segment;
generating a data stream via the data entry database, wherein a timing of the data stream is configured to coincide with a timing of the plurality of segments upon presentation by a multimedia system;
generating at least one query grammar, wherein the at least one query grammar is programmed to interpret commands to access content in the data stream;
simultaneously transmitting, to the multimedia system, the content associated with at least one of the plurality of segments, one or more of the at least one query grammar, and the data stream;
monitoring a user interface element to detect an input query;
determining whether the input query is valid according to the at least one query grammar; and
responsive to the determination that the input query is valid, retrieving content associated with the input query, including any updated information for the data stream.

14. The computer-readable storage medium of claim 13, wherein the at least one query grammar comprises a plurality of respective query grammars associated with each of the plurality of segments.

15. The computer-readable storage medium of claim 13, wherein the content in the data stream is arranged according to an order of the plurality of segments.

16. The computer-readable storage medium of claim 13, wherein at least one data entry template among the respective data entry templates includes a listing of content types associated with a segment classification.

17. The computer-readable storage medium of claim 13, wherein the data stream is configured to provide a cumulative source of content.

18. The computer-readable storage medium of claim 13, wherein the content in the data stream is updated based upon retrieval of updated information.

* * * * *